(12) United States Patent
Makino

(10) Patent No.: US 12,425,217 B2
(45) Date of Patent: Sep. 23, 2025

(54) AUTHENTICATION SYSTEM, USER TERMINAL, AUTHENTICATION METHOD, AND PROGRAM

(71) Applicant: ID HOLDINGS CORPORATION, Tokyo (JP)

(72) Inventor: Takeaki Makino, Tokyo (JP)

(73) Assignee: ID HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 18/725,252

(22) PCT Filed: Aug. 18, 2023

(86) PCT No.: PCT/JP2023/029831
§ 371 (c)(1),
(2) Date: Jun. 28, 2024

(87) PCT Pub. No.: WO2024/070315
PCT Pub. Date: Apr. 4, 2024

(65) Prior Publication Data
US 2025/0062900 A1    Feb. 20, 2025

(30) Foreign Application Priority Data
Sep. 29, 2022   (JP) ................. 2022-156298

(51) Int. Cl.
*H04L 9/32* (2006.01)
*H04L 9/00* (2022.01)

(52) U.S. Cl.
CPC . *H04L 9/32* (2013.01); *H04L 9/50* (2022.05)

(58) Field of Classification Search
CPC . H04L 9/32; H04L 9/50; H04L 9/3239; H04L 9/3247; G06F 21/33; G06F 21/60; G06F 21/64
See application file for complete search history.

(56) References Cited

U.S. PATENT DOCUMENTS

2020/0137064 A1* 4/2020 Wu ................ G06F 16/182
2021/0133700 A1  5/2021 Williams et al.
(Continued)

FOREIGN PATENT DOCUMENTS

JP    2020-507143 A   3/2020
JP       7029212 B1   3/2022

*Primary Examiner* — Taghi T Arani
*Assistant Examiner* — Blake I Narramore
(74) *Attorney, Agent, or Firm* — Oliff PLC

(57) ABSTRACT

In the authentication system, a first wallet of a first decentralized ledger shared by a plurality of first nodes accessible to first information about a user includes a URI of first information, and first specification information for specifying a second wallet of a second decentralized ledger shared by a plurality of second nodes accessible to second information about user, and second wallet includes a URI of second information and second specification information for specifying first wallet. First and second specification information are stored as tokens having non-fungibility, respectively. Second node, in response to a request from a user terminal, requests first node to authenticate second node for user, by using second specification information. The first node, in response to a request from a control part of the user terminal, requests the second node to authenticate the first node for the user, by using the first specification information.

11 Claims, 11 Drawing Sheets

(56) References Cited

U.S. PATENT DOCUMENTS

| | | | |
|---|---|---|---|
| 2023/0245103 A1* | 8/2023 | Lacavera | H04L 9/14 |
| | | | 705/66 |
| 2023/0368186 A1* | 11/2023 | Exline | G06Q 20/1235 |
| 2024/0037519 A1* | 2/2024 | Sardesai | G06Q 20/36 |
| 2024/0046318 A1* | 2/2024 | Muriqi | G06Q 20/389 |

* cited by examiner

Fig.2

| LAYER | URI DATA | SPECIFICATION INFORMATION DATA | SIGNATURE DATA | PUBLIC KEY DATA | PROVISION INFORMATION DATA | |
|---|---|---|---|---|---|---|
| (IMMEDIATELY LOWER LAYER) | inf1 | – | – | OK1 | – | |
| IDa1 | – | sp1 (NT2:WA2) | cc31s | – | – | ← T1 |
| IDa2 | – | sp1 (NT2:WA2) | cc51s | – | – | ← T3 |
| IDa3 | – | sp1 (NT2:WA2) | cc72s | – | – | ← T6 |
| IDa4 | – | – | – | – | PR1 | |

DL1 / W1

| TRANSACTION | STORAGE DESTINATION INFORMATION | | STORED DATA INFORMATION (ATTRIBUTE:DATA) | |
|---|---|---|---|---|
| | ADDRESS | LAYER | | |
| TX11 | WA1 | – | URI: inf1 | PUBLIC KEY: OK1 |
| TX12 | WA1 | IDa1 | SIGNATURE: cc31s | – |
| TX13 | WA1 | IDa1 | SPECIFICATION INFORMATION: sp1(NT2:WA2) | – |
| TX14 | WA1 | IDa2 | SIGNATURE: cc51s | – |
| TX15 | WA1 | IDa2 | SPECIFICATION INFORMATION: sp1(NT2:WA2) | – |
| TX16 | WA1 | IDa3 | SPECIFICATION INFORMATION: sp1(NT2:WA2) | SIGNATURE: cc72s |
| TX17 | WA1 | IDa4 | PROVISION INFORMATION: PR1 | – |

| LAYER | URI DATA | SPECIFICATION INFORMATION DATA | SIGNATURE DATA | PUBLIC KEY DATA | PROVISION INFORMATION DATA | |
|---|---|---|---|---|---|---|
| (IMMEDIATELY LOWER LAYER) | – | – | – | – | – | |
| IDb1 | inf2 | sp2 (NT1:WA1) | cc32s | OK2 | – | ← T2 |
| IDb2 | – | sp2 (NT1:WA1) | cc52s | – | – | ← T4 |
| IDb3 | – | sp2 (NT1:WA1) | cc71s | – | – | ← T5 |

| TRANSACTION | STORAGE DESTINATION INFORMATION | | STORED DATA INFORMATION (ATTRIBUTE:DATA) | | | |
|---|---|---|---|---|---|---|
| | ADDRESS | LAYER | | | | |
| TX21 | WA2 | IDb1 | URI: inf2 | PUBLIC KEY: OK2 | SPECIFICATION INFORMATION: sp2 (NT1:WA1) | SIGNATURE: cc32s |
| TX22 | WA2 | IDb2 | SPECIFICATION INFORMATION: sp2 (NT1:WA1) | SIGNATURE: cc52s | – | – |
| TX23 | WA2 | IDb3 | SIGNATURE: cc71s | – | – | – |
| TX24 | WA2 | IDb3 | SPECIFICATION INFORMATION: sp2 (NT1:WA1) | – | – | – |

AUTHENTICATION SYSTEM, USER TERMINAL, AUTHENTICATION METHOD, AND PROGRAM

CROSS REFERENCE TO RELATED APPLICATIONS

The present application claims the priority benefit of Japanese patent application No. 2022-156298 filed on Sep. 29, 2022. The entire disclosure thereof is incorporated in the present application by reference.

BACKGROUND

Field

The present disclosure relates to an authentication system, a user terminal, an authentication method, and a program.

Related Art

A centralized information management system has risks such as large-scale information leakage and functional disruption due to core system failure. A well-known technique for avoiding such risks is the technique of managing information in a decentralized manner through a decentralized network (for example, Patent Document 1).

PRIOR ART

Patent Document

[Patent Document 1] Japanese Patent Application Publication No. 2020-507143

SUMMARY

If decentralized networks are simply applied to respective existing information management systems, the decentralized networks of information management systems become siloed. In order to improve the convenience of a user, it is desired to connect the decentralized networks in a cooperative state to enhance the interoperability among the networks. However, such cooperative connection among the networks has a risk of information leakage, for example, when information about a user is shared among the networks for the cooperative connection or when the opportunity of exchanging information about a user among the networks increases for the cooperative connection. Therefore, there has been a demand for a technique enabling to appropriately connect decentralized networks in a cooperative state while achieving reduction of a security risk.

The present disclosure is embodied in the following aspects.

(1) In one aspect of the present disclosure, an authentication system is provided. The authentication system includes a first decentralized network equipped with a plurality of first nodes sharing a first decentralized ledger and being accessible to first information about a user, a second decentralized network equipped with a plurality of second nodes sharing a second decentralized ledger and being accessible to second information about the user, and a user terminal used by the user and having a user terminal control part. Each of the plurality of first nodes has a first control part, and each of the plurality of second nodes has a second control part. A first wallet of the first decentralized ledger stores a URI of the first information, and first specification information for specifying a second wallet of the second decentralized ledger, and the first specification information is stored as a first non-fungible token serving as a token having non-fungibility. The second wallet of the second decentralized ledger stores a URI of the second information, and second specification information for specifying the first wallet, and the second specification information is stored as a second non-fungible token serving as a token having non-fungibility. In response to a first request from the user terminal control part, the second control part requests the first node to perform first authentication to authenticate the second node for the user based on the first non-fungible token, by specifying the first wallet using the second specification information. In response to a second request from the user terminal control part, the first control part requests the second node to perform second authentication to authenticate the first node for the user based on the second non-fungible token, by specifying the second wallet using the first specification information.

The present aspect enables to request authentication of the first node by specifying the second wallet using the first specification information, and enables to request the authentication of the second node by specifying the first wallet using the second specification information. Therefore, for the case where each node requests authentication, the node does not need to share the first information or the second information with others, or to exchange the first information or the second information with others. The present aspect enables to reduce a security risk in the authentication of the first node and the second node, and enables to appropriately connect the first decentralized network and the second decentralized network in a cooperative state.

(2) In the aspect above, the first decentralized ledger and the second decentralized ledger may be structured by blockchain, respectively, the URI of the first information and the first specification information may be respectively stored into the first wallet, through execution of transactions stored in blocks added to the first decentralized ledger, and the URI of the second information and the second specification information may be respectively stored into the second wallet, through execution of transactions stored in blocks added to the second decentralized ledger. The present aspect enables to structure the first decentralized network and the second decentralized network as blockchain networks, respectively. Accordingly, the present aspect enables to reduce such a risk compared to centralized information management.

(3) In the aspect above, the first specification information may include a first identifier indicating the second decentralized network, and a second identifier unique in the second decentralized ledger, and specify the second wallet by a combination of the first identifier and the second identifier, the second specification information may include a third identifier indicating the first decentralized network, and a fourth identifier unique in the first decentralized ledger, and specify the first wallet by a combination of the third identifier and the fourth identifier, the second control part, in response to the first request, may specify the first wallet by transmitting the fourth identifier to the first node, and the first control part, in response to the second request, may specify the second wallet by transmitting the second identifier to the second node. The present aspect enables to easily request authentication of each node, by transmitting the second identifier or the fourth identifier between nodes.

(4) In the aspect above, the first wallet may store a first signed code serving as a first authentication code signed by using a private key of the user terminal, as the first non-fungible token, the second wallet may store a second signed code as the second non-fungible token, the second signed code serving as a second authentication code signed by using the private key, the second authentication code corresponding to the first authentication code, when the first request is executed, the second control part may then transmit the second signed code to the first node, and when the first authentication is requested, the first control part may then determine whether or not the first signed code and the second signed code correspond to each other, and when the first signed code and the second signed code correspond to each other, then authenticate the second node. The present aspect enables to easily authenticate the second node, through the verification of the correspondence between the first signed code serving as the first non-fungible token and the second signed code serving as the second non-fungible token.

(5) In the aspect above, an expiration date may be set for the first signed code stored as the first non-fungible token, and when the first authentication is requested, the first control part may then determine whether or not the first signed code not having expired yet and the second signed code correspond to each other. The present aspect enables to authenticate the second node when the first signed code has not expired yet, and thus enables to reduce a security risk in the first authentication.

(6) In the aspect above, the first control part, when authenticating the second node, may then provide the first information to the second node, and record information indicating provision of the first information to the second node, into the first decentralized ledger. The present aspect enables to improve tamper resistance of the first decentralized ledger.

(7) In the aspect above, the first information may be stored in first database accessible from the first decentralized network, the second information may be stored in second database accessible from the second decentralized network, the first control part, when authenticating the second node, may then provide the first information acquired from the first database, to the second node, and the second control part, when authenticating the first node, may then provide the second information acquired from the second database, to the first node. The present aspect enables to reduce a security risk, compared to, for example, the aspect in which the second node directly accesses the first information, and the aspect in which the first node directly accesses the second information.

(8) In the aspect above, when the first request is executed, the second control part may then request the first node to perform the first authentication, after completion of first local authentication of the user by the user terminal, and first public key authentication of the user terminal executed by the second control part after the first local authentication, and when the second request is executed, the first control part may then request the second node to perform the second authentication, after completion of second local authentication of the user by the user terminal, and second public key authentication of the user terminal executed by the first control part after the second local authentication. The present aspect allows each node when having received the first request or the second request from the user terminal to request authentication of the node, after the completion of the appropriate authentication of the user terminal by use of the local authentication and the public key authentication.

The present disclosure may be embodied in various aspects other than the authentication system, for example, a user terminal, and an authentication method. The present disclosure may be embodied further in various aspects such as a decentralized network system, and a non-transitory tangible recording medium which records a computer program.

BRIEF DESCRIPTION OF THE DRAWINGS

FIG. 2 is a diagram illustrating a first decentralized ledger.
FIG. 3 is a diagram illustrating a second decentralized ledger.

DETAILED DESCRIPTION

A. First Embodiment

Figure 1:
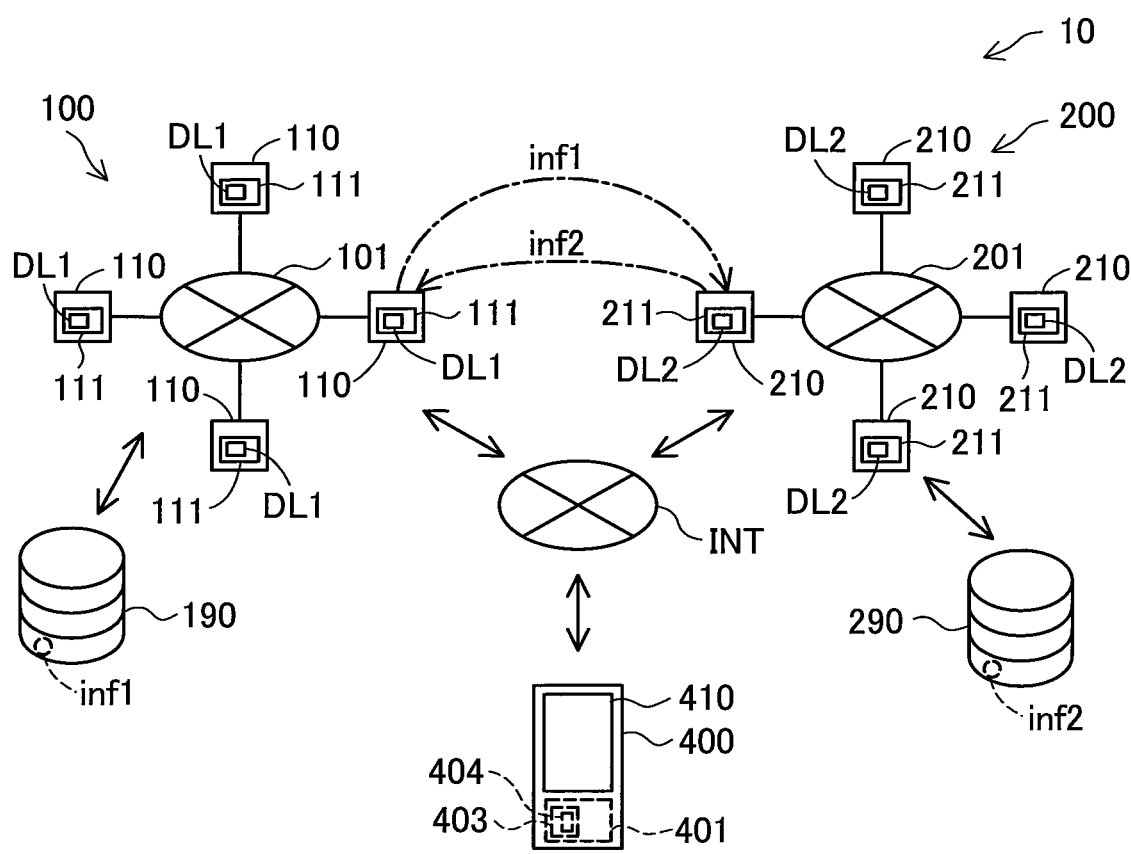
FIG. 1 is an explanatory diagram illustrating an authentication system in a first embodiment.

FIG. 1 is an explanatory diagram illustrating an authentication system 10 in the present embodiment. The authentication system 10 includes a first network system 100, a second network system 200, and a user terminal 400. The network systems and the user terminal 400 are configured to perform mutual communication via the Internet INT.

The first network system 100 includes a first decentralized network 101 equipped with a plurality of first nodes 110. The first nodes 110 are connected to each other by P2P (peer-to-peer) basis. In the present embodiment, the first network system 100 further includes a first database 190 which is accessible from the first decentralized network 101. The first network system 100 is configured as a management system which manages personal numbers assigned to individuals in order to provide public services. A network system including a decentralized network is also referred to as a decentralized network system.

Each of the first nodes 110 is configured to be accessible to a first information inf1 about a user who uses the user terminal 400. In the present embodiment, the first information inf1 is a personal number given to the user, and is stored in the first database 190.

The first nodes 110 share a first decentralized ledger DL1. In the present embodiment, the first decentralized ledger DL1 is structured by blockchain. The first decentralized network 101 is thus configured as a blockchain network. The blockchain which structures the decentralized ledger may be, for example, a public blockchain type, or a private blockchain type. In another example, some of the plurality of nodes included in the blockchain network do not need to be full nodes, and may be lightweight nodes.

Each of the first nodes 110 includes a first control part 111. The first control part 111 is configured as a computer including a CPU, a storage part, and an input/output interface which inputs and outputs a signal from and to the outside. The storage part included in the first control part 111 stores the first decentralized ledger DL1. The CPU included in the first control part 111 executes programs stored in the storage part, thereby making the first control part 111 realize various functions such as a function of executing a transaction on the first decentralized ledger DL1, and a function of requesting second authentication to be described later.

The second network system 200 includes a second decentralized network 201 equipped with a plurality of second nodes 210. The second nodes 210 are connected to each other by P2P basis. In the present embodiment, the second network system 200 further includes a second database 290 which is accessible from the second decentralized network 201. The second network system 200 is configured as a management system which manages personal medical data.

Each of the second nodes 210 is configured to be accessible to a second information inf2 about the user. In the present embodiment, the second information inf2 is a management ID used for managing user medical data, and is stored in the second database 290.

The second nodes 210 share a second decentralized ledger DL2. In the present embodiment, the second decentralized ledger DL2 is structured by blockchain, as with the first decentralized ledger DL1.

Each of the second nodes 210 includes a second control part 211. As with the first control part 111, the second control part 211 is configured as a computer including a CPU, a storage part, and an input/output interface. The storage part included in the second control part 211 stores the second decentralized ledger DL2. The CPU included in the second control part 211 executes programs stored in the storage part, thereby making the second control part 211 realize various functions such as a function of executing a transaction on the second decentralized ledger DL2, and a function of requesting first authentication to be described later.

The user terminal 400 is used by the user. The user terminal 400 includes a user terminal control part 401 and a display part 410. As with the first control part 111, the user terminal control part 401 is configured as a computer including a CPU, a storage part 403, and an input/output interface. The CPU included in the user terminal control part 401 executes a program 404 stored in the storage part 403, thereby making the user terminal control part 401 realize various functions, for example, a function of executing a first request to be described later, and a function of executing a second request. The program 404 may be, for example, a dedicated application program available for use in the user terminal control part 401, or may be a function extension program which is available for use in the user terminal control part 401 to extend the function of a general-purpose application (for example, a web browser). The display part 410 is configured as a touch-operable liquid crystal display, and also serves as an input part and an operation part.

FIG. 2 is a diagram illustrating the first decentralized ledger DL1. The first decentralized ledger DL1 has a first wallet W1. In the first decentralized ledger DL1, the first wallet W1 is specified by a first wallet address WA1 which is unique in the first decentralized ledger DL1. In the present embodiment, the first wallet W1 is configured to store data, in each layer in the first wallet W1. For example, the first wallet W1 is configured to store URI (Uniform Resource Identifier) data, specification information data, signature data, public key data, and provision information data, in each layer in the first wallet W1. For example, in the immediately lower layer of the first wallet W1, the URI of the first information inf1 is stored as URI data, and a first public key OK1 is stored as public key data. In a layer IDa1 in the first wallet W1, a first specification information sp1 which specifies a second wallet W2 of the second decentralized ledger DL2 is stored as specification information data, and a signed code cc31s is stored as signature data.

The first specification information sp1 is stored in the first wallet W1, as a first non-fungible token T1 which is a token having non-fungibility. Here, "a token having non-fungibility" refers to a unique non-fungible token, which is not a fungible token such as so-called cryptocurrency asset (also referred to as virtual currency). The first specification information sp1 is stored as NFT (non-fungible token) which conforms to a token standard, for example, ERC-721, ERC-1155, or ERC-4907. In the present embodiment, the signed code cc31s, as with the first specification information sp1, is stored in the first wallet W1 also as the first non-fungible token T1.

FIG. 2 shows a transaction data TD1 indicating the transactions to be executed on the first decentralized ledger DL1. In the present embodiment, information is stored into the first wallet W1 as described above, through the execution of the transactions on the first decentralized ledger DL1. The transactions included in the transaction data TD1 are stored in the blocks added to the first decentralized ledger DL1 structured by blockchain. FIG. 2 shows respective types of data in the first wallet W1 separately from the transaction data TD1, for the purpose of facilitating the understanding of the technique, but in practice, the respective types of data in the first wallet W1 in the present embodiment are realized by the transaction data TD1.

Each of the transactions included in the transaction data TD1 includes the description of storage destination information indicating a storage destination of information through the transaction, and the description of stored data information indicating the data to be stored in the storage destination and the data attribute thereof. The storage destination information includes not only a wallet address which specifies a wallet of storage destination, but also information of further specifying a layer in the wallet of the storage destination. The stored data information is indicated in the form of "Attribute: Data" in FIG. 2. For example, a transaction TX12 includes the description of the first wallet address WA1 which specifies the first wallet W1 and the layer IDa1 of the first wallet W1, as storage destination information, and the description of a signed code cc31s serving as signature data, as data information. The transaction TX12 is executed, thereby storing the signed code cc31s as signature data, into the first wallet W1 specified by the first wallet address WA1. A transaction TX11 includes no description of information for specifying a layer of storage destination. In the present embodiment, when a transaction including no description of information about a layer of storage destination is executed, the data in the data information of the transaction is stored into the immediately lower layer of the wallet specified by the wallet address.

FIG. 3 is a diagram illustrating the second decentralized ledger DL2. The second decentralized ledger DL2 has the second wallet W2. In the second decentralized ledger DL2, the second wallet W2 is specified by a second wallet address WA2 which is unique in the second decentralized ledger DL2. In the present embodiment, the second wallet W2, as with the first wallet W1, is configured to store data, in each layer in the second wallet W2. For example, the second wallet W2 stores, in a layer IDb1, the URI of the second information inf2 as URI data, a second specification information sp2 as specification information data, a signed code cc32s as signature data, and a second public key OK2 as public key data. As with the first specification information sp1, the second specification information sp2 is stored in the second wallet W2, as a second non-fungible token T2 which is a token having non-fungibility. In the present embodiment, the signed code cc32s is stored in the second wallet W2, also as the second non-fungible token T2.

FIG. 3 shows a transaction data TD2 indicating the transactions to be executed on the second decentralized ledger DL2. Information is stored into the second wallet W2, through the execution of the transactions on the second decentralized ledger DL2. The transactions included in the transaction data TD2 are stored in the blocks added to the second decentralized ledger DL2. In the present embodiment, as with the first wallet W1, respective types of data in the second wallet W2 are realized by the transaction data TD2. As with the transaction data TD1, each of the transactions included in the transaction data TD2 includes the description of storage destination information and stored data information.

In the present embodiment, the first specification information sp1 and the second specification information sp2 are respectively in multilayer-registration-type data structures. More specifically, the first specification information sp1 includes the first identifier which indicates the second decentralized network 201, and the second identifier which is unique in the second decentralized ledger DL2. The first specification information sp1 specifies the second wallet W2 by a combination of the first identifier and the second identifier. In FIG. 2, the first specification information sp1 is indicated in the form of "First identifier: Second identifier". In the present embodiment, the first identifier is the URN (Uniform Resource Name) of the second decentralized network 201, and is indicated as "NT2" in FIG. 2. The second identifier is the second wallet address WA2. Similarly, the second specification information sp2 shown in FIG. 3 includes the third identifier which indicates the first decentralized network 101, and the fourth identifier which is unique in the first decentralized ledger DL1. In FIG. 3, the second specification information sp2 is indicated in the form of "Third identifier: Fourth identifier". The second specification information sp2 specifies the first wallet W1 by a combination of the third identifier and the fourth identifier. In the present embodiment, the third identifier is the URN of the first decentralized network 101, and is indicated as "NT1" in FIG. 3. The fourth identifier is the first wallet address WA1.

Figure 4:
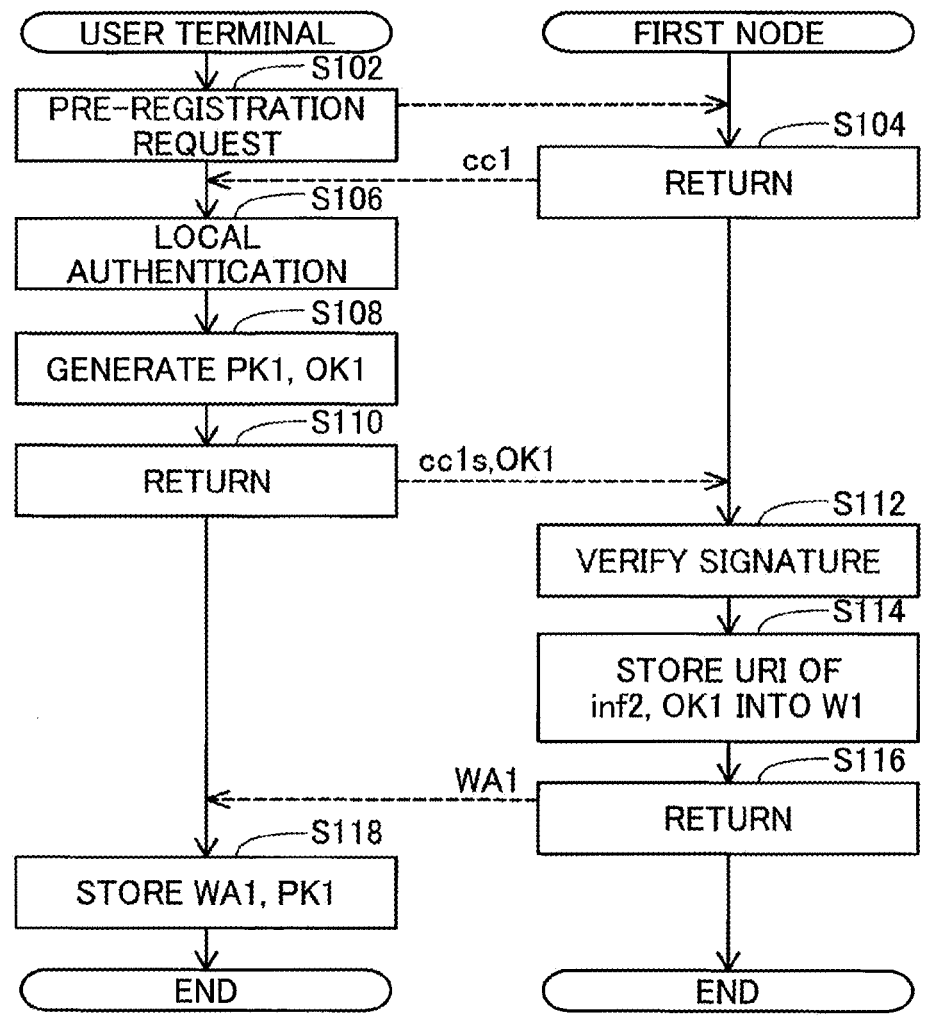
FIG. 4 is an explanatory diagram illustrating pre-registration processing.
Figure 5:
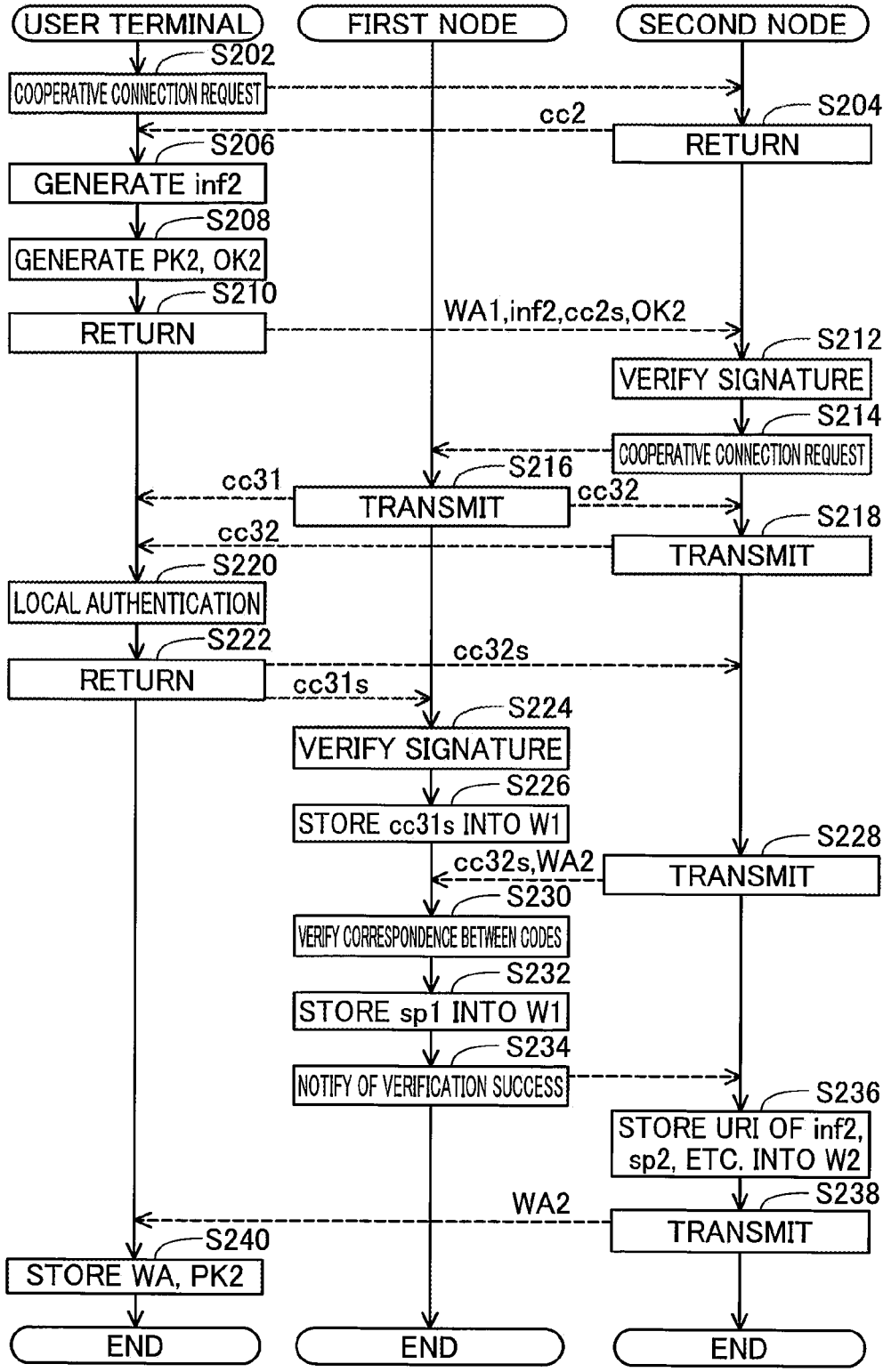
FIG. 5 is an explanatory diagram illustrating cooperative connection processing.

FIG. 4 is an explanatory diagram illustrating pre-registration processing. FIG. 5 is an explanatory diagram illustrating cooperative connection processing. The cooperative connection processing refers to the processing of storing the first specification information sp1 into the first wallet W1 and further storing the second specification information sp2 into the second wallet W2. The pre-registration processing means the processing of storing the first information inf1 into the first wallet W1 prior to the cooperative connection processing. The first cooperative connection processing is executed, thereby bringing the first decentralized network 101 and the second decentralized network 201 into a cooperative connection state. When certain two networks are in a cooperative connection state, the nodes included in the respective networks may mutually request node authentication. The node authentication herein means that, in response to a request from the user terminal control part 401, a control part of a node included in one network requests a node included in the other network to authenticate the own node for the user, by using the specification information stored in the storage part of the own control part.

More specifically, for example, when the first decentralized network 101 and the second decentralized network 201 are in a cooperative connection state, the second control part 211 is able to request the first control part 111 to perform the first authentication, by using the second specification information sp2, in response to the first request from the user terminal control part 401, and the first control part 111 is able to request the second control part 211 to perform the second authentication, by using the first specification information sp1, in response to the second request from the user terminal control part 401. The first authentication herein means that the first node 110 authenticates the second node 210 for the user based on the first non-fungible token T1. The second authentication herein means that the second node 210 authenticates the first node 110 for the user based on the second non-fungible token T2. In the present embodiment, the first request and the first authentication are executed in the first authentication processing to be described later. The second request and the second authentication are executed in the second authentication processing to be described later.

The pre-registration processing illustrated in FIG. 4 is executed prior to the cooperative connection processing, for example, in the case where a predetermined start operation has been performed by the user on the user terminal 400. In step S102, the user terminal control part 401 executes a pre-registration request to the first node 110. In step S102 in the present embodiment, the user terminal control part 401 transmits, to the first node 110, a predetermined request message, and identification information for the first node 110 to identify the first information inf1 on the first database 190. The identification information is stored in, for example, an IC card so as to be readable by the user terminal 400.

When the pre-registration request is executed, the first control part 111 then executes user authentication by using local authentication and public key authentication in the steps from step S104 to step S112. More specifically, in the steps from step S104 to step S112, the first control part 111 authenticates the user by FIDO (Fast IDentity Online) authentication. In step S104, the first control part 111 returns a challenge code cc1 to the user terminal 400.

In step S106, the user terminal control part 401 having received the challenge code cc1 executes the local authentication of the user. Examples of the local authentication include biometric authentication such as facial authentication by using the camera provided on the user terminal 400 and fingerprint authentication by using a fingerprint reader, authentication by using a PIN (Personal Identification Number), and pattern authentication. When the local authentication fails, the user terminal control part 401 then executes predetermined error processing. In this case, for example, the user terminal control part 401 may notify the user of the error via the display part 410 or a speaker unit and further re-execute the local authentication, or may terminate the pre-registration processing when the local authentication fails a predetermined number of times. When the local authentication succeeds, then in step S108, the user terminal control part 401 generates a first private key PK1, and the first public key OK1 paired with the first private key PK1. For example, RSA encryption or elliptic curve cryptography is used to generate the first private key PK1 and the first public key OK1. Hereinafter, the first private key PK1 is also referred to simply as a private key, and the first public key OK1 is also referred to simply as a public key.

In step S110, the user terminal control part 401 digitally signs the challenge code cc1 by using the first private key PK1. The challenge code cc1 signed by using the first private key PK1 is also referred to as the signed code cc1s. The user terminal control part 401 thereafter returns the signed code cc1*s* and the first public key OK1 to the first node 110.

In step S112, the first control part 111 verifies the signature of the signed code cc1*s* by using the first public key OK1. When the verification of the signature fails, the first control part 111 then executes predetermined error processing. In this case, for example, the first control part 111 notifies the user terminal 400 of the error. When the verification of the signature succeeds, then in step S114, the first control part 111 executes a transaction on the first decentralized ledger DL1, thereby storing the URI of the first information inf1 and the first public key OK1 into the first wallet W1 specified by the first wallet address WA1. The first wallet address WA1 is generated irreversibly from the first public key OK1, prior to step S116. Therefore, as with the first public key OK1, the first wallet address WA1 is paired with the first private key PK1.

More specifically, in step S114 in the present embodiment, the transaction TX11 illustrated in FIG. 2 is executed. The transaction TX11 includes the description of the first wallet address WA1 as storage destination information, and the description of the URI of the first information inf1 serving as URI data and the first public key OK1 serving as public key data, as stored data information. The URI of the first information inf1 is acquired by the first control part 111 from the first database 190 based on the identification information received in step S104, as an example. "Execution of a transaction on a decentralized ledger" means generating a transaction by a node having a decentralized ledger, and thereafter propagating the transaction to other nodes sharing the decentralized ledger. As a result, the decentralized ledger is updated. More specifically, in the present embodiment, the transaction generated on a decentralized ledger structured by blockchain is propagated to respective nodes sharing the decentralized ledger, and verified. When the verification succeeds, the transaction is then stored into a block added to the decentralized ledger. Examples of the consensus algorithm of the blockchain include PoW (Proof of Work), PoS (Proof of Stake), and PoI (Proof of Importance).

In step S116, the first control part 111 returns the first wallet address WA1 to the user terminal 400. In step S118, the user terminal control part 401 stores the first wallet address WA1 and the first private key PK1 into the storage part 403. After step S118, the user terminal control part 401 uses the first wallet address WA1 also as the path indicating a data location in the storage part 403.

The cooperative connection processing illustrated in FIG. 5 is executed after the completion of the pre-registration processing, for example, when a predetermined start operation is performed by the user on the user terminal 400. In step S202, the user terminal control part 401 executes a first cooperative connection request to the second node 210. In step S202, the user terminal control part 401 transmits a predetermined request message to the second node 210, and specifies a connection destination subjected to the cooperative connection with the second decentralized network 201. In the present embodiment, the user terminal control part 401 specifies the first decentralized network 101 as a connection destination by, for example, transmitting the URI of the first decentralized network 101 to the second node 210. When the first cooperative connection request is executed, then in step S204, the second control part 211 returns a challenge code cc2 to the user terminal 400.

In step S206, the user terminal control part 401 having received the challenge code cc2 generates the second information inf2. The second information inf2 is generated based on, for example, a mail address of the user. Next in step S208, the user terminal control part 401 generates a second private key PK2 and the second public key OK2 paired with the second private key PK2, in the same manner as step S108 of FIG. 4. In step S210, the user terminal control part 401 digitally signs the challenge code cc2 by using the second private key PK2. The challenge code cc2 signed by using the second private key PK2 is also referred to as a signed code cc2*s*. The user terminal control part 401 thereafter returns the first wallet address WA1, the second information inf2, the signed code cc2*s*, and the second public key OK2, to the second node 210.

In step S212, the second control part 211 verifies the signature of the signed code cc2*s* by using the second public key OK2, as in step S112 of FIG. 4. When the verification of the signature succeeds, then in step S214, the second control part 211 executes a second cooperative connection request to the first node 110. In step S214, the second control part 211 specifies the first wallet address WA1 as a transmission destination, and transmits a predetermined request message to the first node 110.

When the second cooperative connection request is executed, then in step S216, the first control part 111 specifies the first wallet address WA1 as a transmission destination, transmits a challenge code cc31 to the user terminal 400, and returns a challenge code cc32 corresponding to the challenge code cc31, to the second node 210. In the present embodiment, the challenge code cc31 and the challenge code cc32 are the same code. The challenge code cc31 is also referred to as a first authentication code, and the challenge code cc32 is also referred to as a second authentication code.

In step S218, the second control part 211 having received the challenge code cc32 specifies the first wallet address WA1 as a transmission destination, and transmits the challenge code cc32 to the user terminal 400.

In step S220, the user terminal control part 401 having received the both challenge codes executes the local authentication of the user, as in step S106 of FIG. 4. When the local authentication succeeds, then in step S222, the user terminal control part 401 digitally signs the challenge code cc31 and the challenge code cc32, by using the first private key PK1. The challenge code cc31 signed by using the first private key PK1 is also referred to as the signed code cc31*s* or the first signed code. The challenge code cc32 signed by using the first private key PK1 is also referred to as the signed code cc32*s* or the second signed code. The user terminal control part 401 thereafter returns the signed code cc31*s* to the first node 110, and returns the signed code cc32*s* to the second node 210.

In step S224, the first control part 111 verifies the signature of the signed code cc31*s* by using the first public key OK1, as in step S112 of FIG. 4. When the verification of the signature succeeds, then in step S226, the first control part 111 executes a transaction on the first decentralized ledger DL1, thereby storing the signed code cc31*s* verified by using the first public key OK1 into the first wallet W1, as the first non-fungible token T1. In step S226 in the present embodiment, the transaction TX12 illustrated in FIG. 2 is executed. In the present embodiment, an expiration date is set for the signed code cc31*s*.

In step S228, the second control part 211 having received the signed code cc32*s* from the user terminal control part 401 specifies the first wallet address WA1 as a transmission destination, and transmits the signed code cc32*s* and the second wallet address WA2 to the first node 110. For example, in step S228, the second wallet address WA2 is generated irreversibly from the second public key OK2.

In step S230, the first control part 111 determines whether or not the signed code cc31s and the signed code cc32s correspond to each other. For example, in step S230, the first control part 111 may directly verify the correspondence between the signed codes, or may first decrypt the respective signed codes into the challenge codes by using the first public key OK1 and thereafter verify the correspondence between the challenge codes. When determining that the signed code cc31s and the signed code cc32s do not correspond to each other, the first control part 111 then executes predetermined error processing. In this case, for example, the first control part 111 notifies the second node 210 and the user terminal 400 of the failure of the authentication. When determining that the signed code cc31s and the signed code cc32s correspond to each other, then in step S232, the first control part 111 then executes a transaction on the first decentralized ledger DL1, thereby storing the first specification information sp1 as specification information data into the layer IDa1 of the first wallet W1. The first specification information sp1 is stored as the first non-fungible token T1. In step S232 in the present embodiment, a transaction TX13 illustrated in FIG. 2 is executed. The transaction TX13 includes the description of the first wallet address WA1 and the layer IDa1 as storage destination information, and the description of the first specification information sp1 serving as specification information data, as stored data information. In step S234, the first control part 111 transmits, to the second node 210, a verification success notification indicating the success of the verification of the signature.

In step S236, the second control part 211 having received the verification success notification executes a transaction on the second decentralized ledger DL2, thereby storing the URI of the second information inf2, the second public key OK2, the second specification information sp2, and the signed code cc32s, into the second wallet W2. In step S236 in the present embodiment, a transaction TX21 illustrated in FIG. 3 is executed. The transaction TX21 includes the description of the second wallet address WA2 and the layer IDb1 of the second wallet W2, as storage destination information, and the description of the URI of the second information inf2 serving as URI data, the second public key OK2 serving as public key data, the second specification information sp2 serving as specification information data, and the signed code cc32s serving as signature data, as stored data information. In the present embodiment, the second information inf2, the second public key OK2, the second specification information sp2, and the signed code cc32s are stored as the second non-fungible token T2.

In step S238, the second control part 211 transmits the second wallet address WA2 to the user terminal 400. In step S240, the user terminal control part 401 stores the second wallet address WA2 and the second private key PK2 into the storage part 403. After step S240, the user terminal control part 401 uses the second wallet address WA2 also as the path indicating a data location in the storage part 403.

Figure 6:
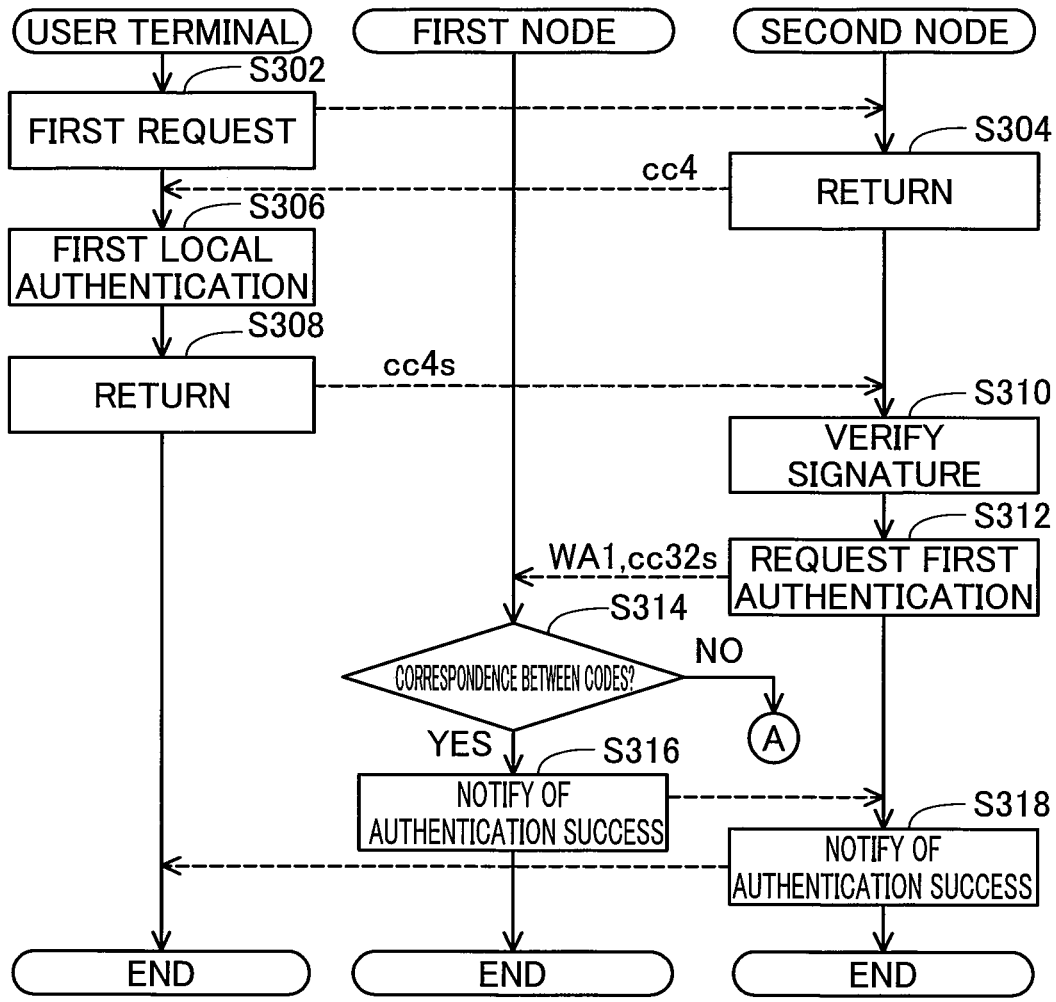
FIG. 6 is a first diagram illustrating first authentication processing.
Figure 7:
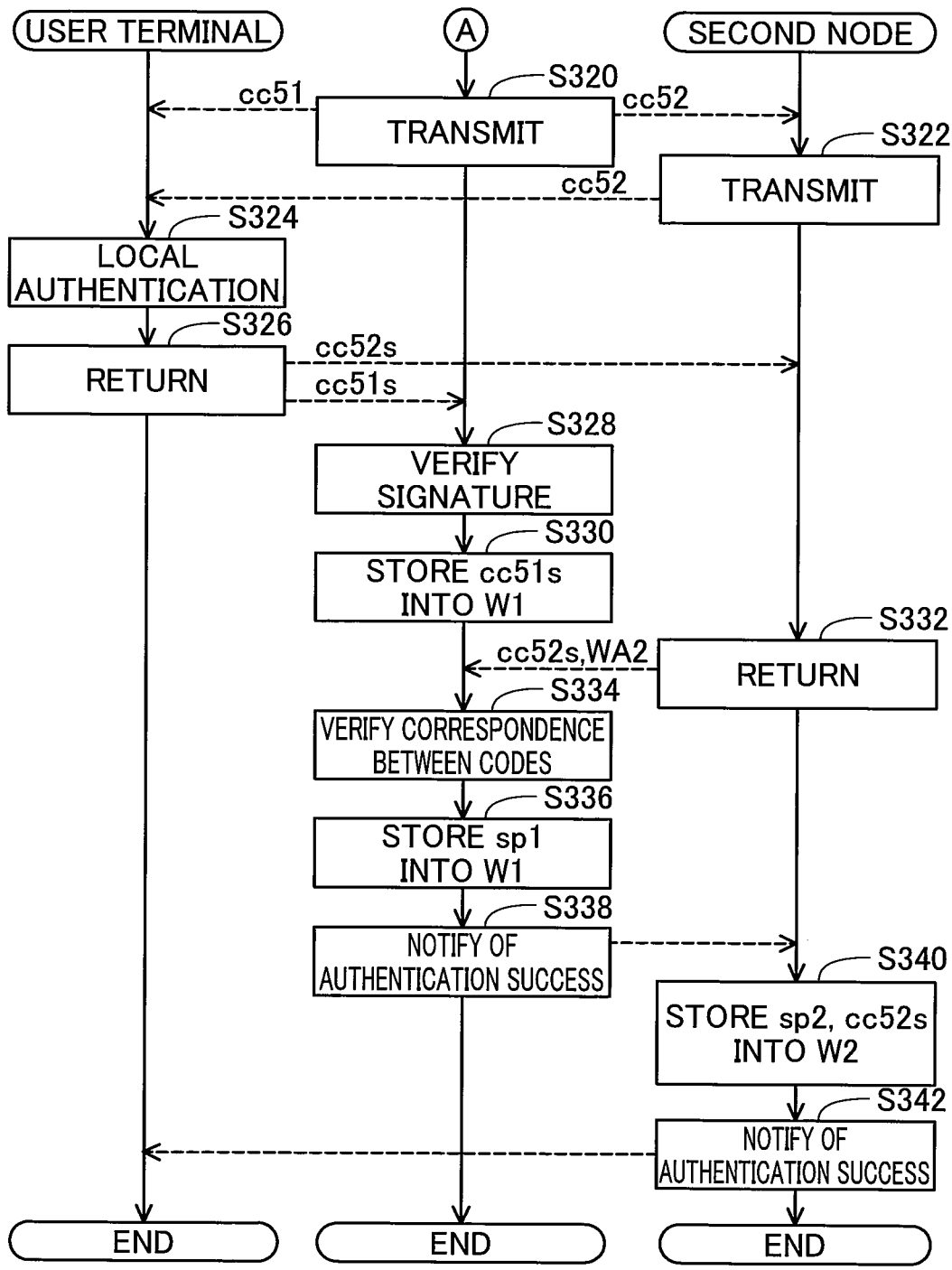
FIG. 7 is a second diagram illustrating the first authentication processing.

FIG. 6 is the first diagram illustrating the first authentication processing. FIG. 7 is the second diagram illustrating the first authentication processing. The first authentication processing illustrated in FIG. 6 and FIG. 7 is executed after the completion of the cooperative connection processing illustrated in FIG. 5, for example, when a predetermined start operation is performed by the user on the user terminal 400. For example, the user starts the first authentication processing in order to make the second control part 211 acquire the first information inf1 after the completion of the first authentication processing. In step S302, the user terminal control part 401 executes the first request to the second node 210. For example, in step S302, the user terminal control part 401 specifies the second wallet address WA2 as a transmission destination, and transmits a predetermined request message to the second node 210. When the first request is executed, then in step S304, the second control part 211 returns a challenge code cc4 to the user terminal 400.

In the steps from step S306 to step S310, the second control part 211 authenticates the user by FIDO authentication. In step S306, the user terminal control part 401 having received the challenge code cc4 executes the local authentication of the user, as in step S106 of FIG. 4. The local authentication of the user to be executed by the user terminal 400 after the execution of the first request, like in step S306, is also referred to as first local authentication.

When the first local authentication succeeds, then in step S308, the user terminal control part 401 signs the challenge code cc4 by using the second private key PK2. The challenge code cc4 signed by using the second private key PK2 is also referred to as a signed code cc4s. The user terminal control part 401 then returns the signed code cc4s to the second node 210. In step S310, the second control part 211 having received the signed code cc4s verifies the signature of the signed code cc4s by using the second public key OK2, as in step S212 of FIG. 5. The public key authentication of the user terminal 400 to be executed by the second control part 211 after the first local authentication, like in step S310, is also referred to as first public key authentication.

When the verification of the signature succeeds, then in step S312, the second control part 211 requests the first node 110 to perform the first authentication, by specifying the first wallet W1 using the second specification information sp2. More specifically, in step S312, the second control part 211 specifies the first wallet W1 by transmitting, as the header, the first wallet address WA1 serving as the fourth identifier, to the first node 110. As described above, in the present embodiment, the first authentication is requested after the completion of the FIDO authentication by the first local authentication and the first public key authentication. In step S312 in the present embodiment, the second control part 211 further transmits the signed code cc32s stored in the second wallet W2, to the first node 110.

In step S314, the first control part 111 having received the first wallet address WA1 and the signed code cc32s verifies whether or not the transmitted signed code cc32s and the signed code cc31s stored as the first non-fungible token T1 in the first wallet W1 correspond to each other, as in step S230 of FIG. 5. More specifically, in step S314 in the present embodiment, the first control part 111 verifies whether or not the signed code cc31s which has not expired yet and the signed code cc32s correspond to each other. When the signed code cc31s has expired, the first control part 111 then determines that the signed code cc31s and the signed code cc32s do not correspond to each other. When determining that the codes correspond to each other, the first control part 111 then authenticates the second node 210, and thereafter in step S316, notifies the second node 210 of the success of the first authentication. In step S318, the second control part 211 notifies the user terminal 400 of the success of the first authentication.

FIG. 7 illustrates the processing of the case where the verification of the signed codes has failed in the first authentication processing in step S314 of FIG. 6. In step S320, the first control part 111 specifies the first wallet address WA1 as a transmission destination, transmits a challenge code cc51 to the user terminal 400, and returns a challenge code cc52 corresponding to the challenge code cc51, to the second node 210. In the present embodiment, the challenge code cc51 and the challenge code cc52 are the same code. In step S322, the second node 210 specifies the first wallet address WA1 as a transmission destination, and transmits the challenge code cc52 to the user terminal 400.

In step S324, the user terminal control part 401 executes the local authentication of the user, as in step S220 of FIG. 5. When the local authentication succeeds, then in step S326, the user terminal control part 401 digitally signs the challenge code cc51 and the challenge code cc52, by using the first private key PK1 paired with the specified first wallet address WA1. The user terminal control part 401 then returns a signed code cc51s serving as the challenge code cc51 signed by using the first private key PK1, to the first node 110, and returns a signed code cc52s serving as the challenge code cc52 signed by using the first private key PK1, to the second node 210.

In step S328, the first control part 111 verifies the signature of the signed code cc51s, as in step S224 of FIG. 5. When the verification of the signature succeeds, then in step S330, the first control part 111 stores the signed code cc51s into the first wallet W1 as a third non-fungible token T3 having non-fungibility, as in step S226 of FIG. 5. In step S330 in the present embodiment, a transaction TX14 illustrated in FIG. 2 is executed. The transaction TX14 includes the description of the first wallet address WA1 and a layer IDa2, as storage destination information, and the description of the signed code cc51s serving as signature data, as stored data information. In the present embodiment, an expiration date is set for the signed code cc51s.

In step S332, the second control part 211 transmits the signed code cc52s and the second wallet address WA2 to the first node 110, as in step S228 of FIG. 5. In step S334, the first control part 111 determines whether or not the signed code cc51s and the signed code cc52s correspond to each other, as in step S230 of FIG. 5. When determining that the codes correspond to each other, then in step S336, the first control part 111 stores the first specification information sp1 serving as specification information data into the layer IDa2 of the first wallet W1 as the third non-fungible token T3, as in step S232 of FIG. 5. In step S336 in the present embodiment, a transaction TX15 illustrated in FIG. 2 is executed. The transaction TX15 includes the description of the first wallet address WA1 and the layer IDa2, as storage destination information, and the description of the first specification information sp1 serving as specification information data, as stored data information. When determining that the codes correspond to each other, the first control part 111 then authenticates the second node 210, and thereafter in step S338, notifies the second node 210 of the success of the authentication.

In step S340, the second control part 211 stores the second specification information sp2 and the signed code cc52s into the second wallet W2, as in step S236 of FIG. 5. In step S340 in the present embodiment, a transaction TX22 illustrated in FIG. 3 is executed. The transaction TX22 includes the description of the second wallet address WA2 and a layer IDb2, as storage destination information, and the description of the second specification information sp2 serving as specification information data and the signed code cc52s serving as signature data, as stored data information. The second specification information sp2 and the signed code cc52s are stored as a fourth non-fungible token T4 having non-fungibility. Step S342 is the same as step S318 of FIG. 6.

Figure 8:
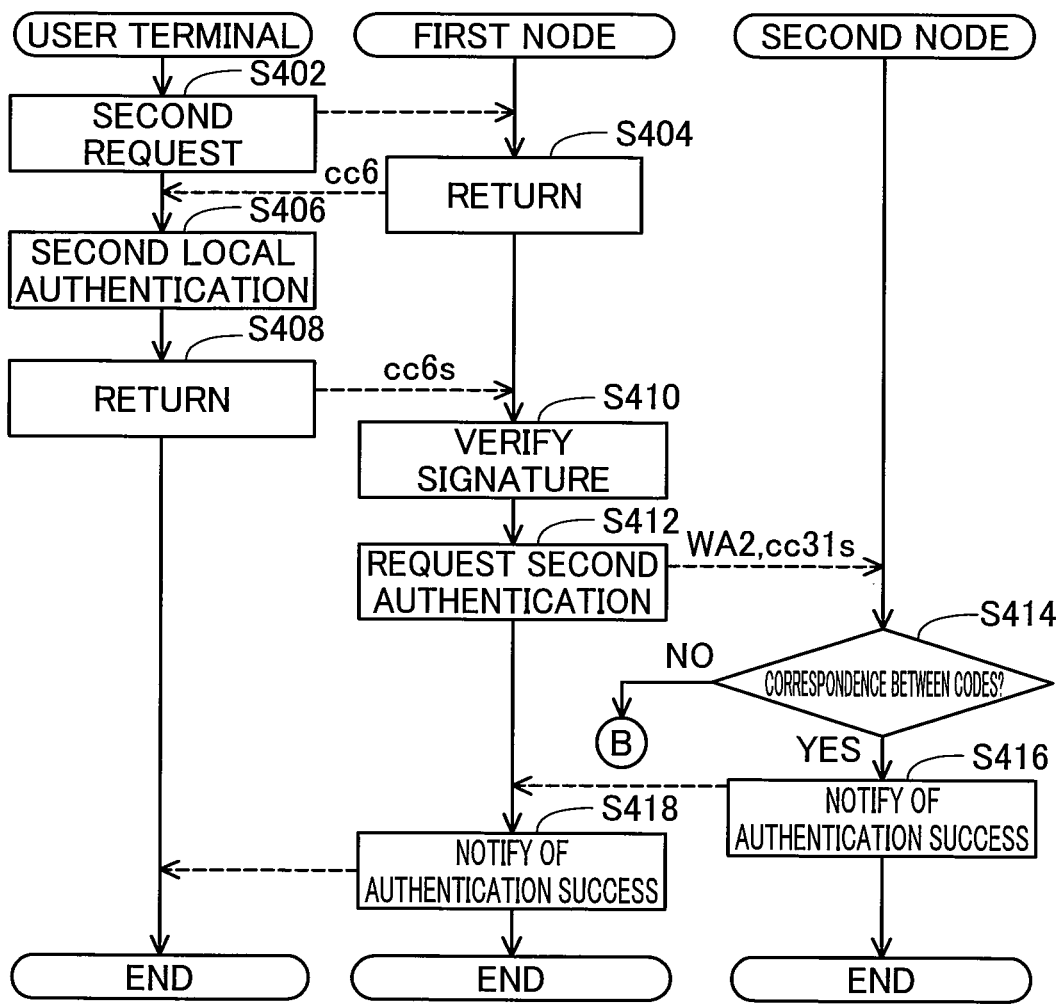
FIG. 8 is a first diagram illustrating second authentication processing.
Figure 9:
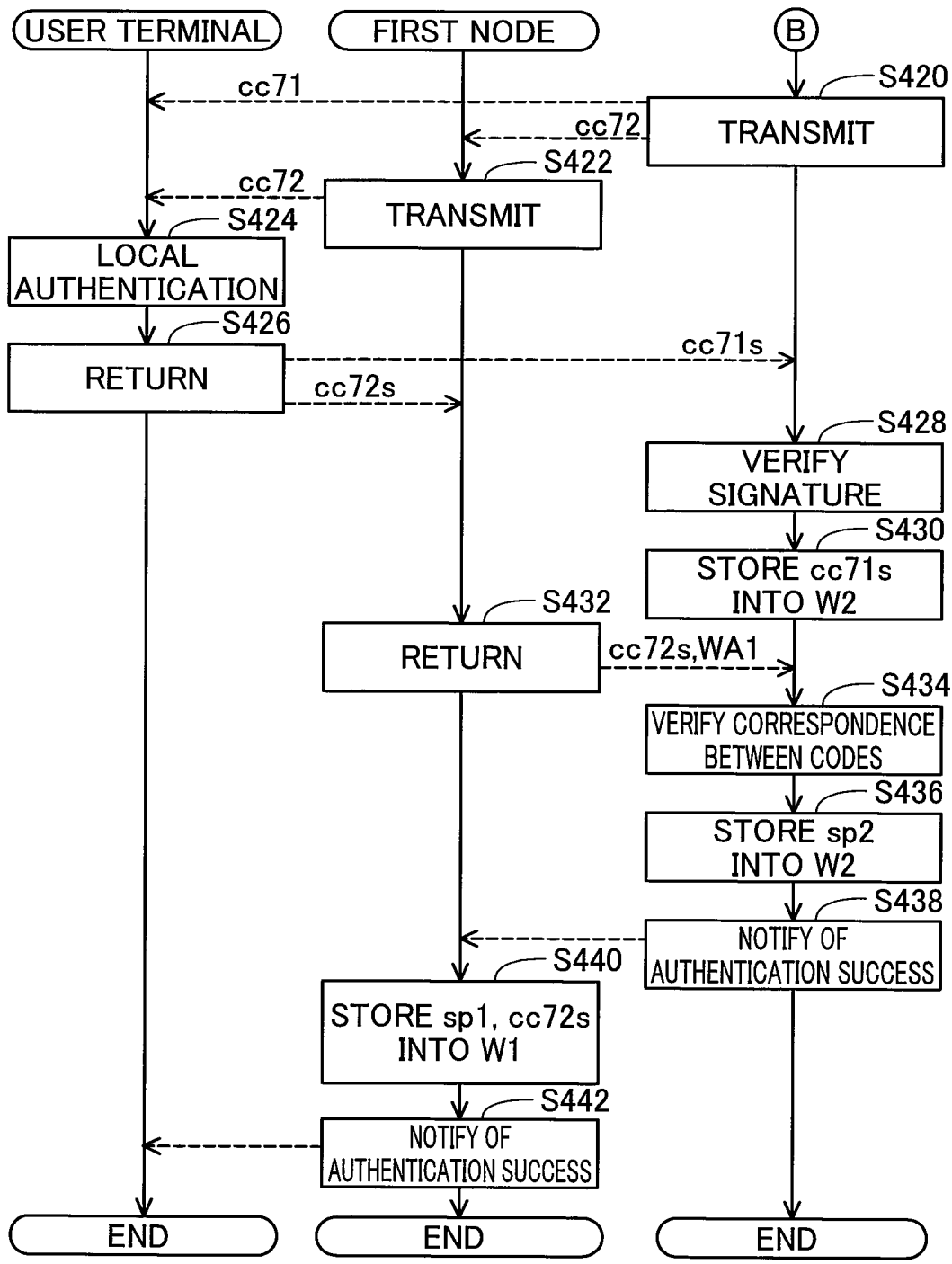
FIG. 9 is a second diagram illustrating the second authentication processing.

FIG. 8 is the first diagram illustrating the second authentication processing. FIG. 9 is the second diagram illustrating the second authentication processing. The second authentication processing is substantially the same as the processing in which the first node 110 and the second node 210 are interchanged in the first authentication processing. More specifically, the steps from step S402 to step S442 of FIG. 8 and FIG. 9 correspond to the steps from step S302 to step S342 of FIG. 6 and FIG. 7, respectively. The second authentication processing is executed after the completion of the cooperative connection processing illustrated in FIG. 5, for example, when a predetermined start operation is performed by the user on the user terminal 400. For example, the user starts the second authentication processing in order to make the first control part 111 acquire the second information inf2 after the completion of the second authentication processing.

First, in step S402, the user terminal 400 executes the second request to the first node 110. In step S404, the first control part 111 returns a challenge code cc6 to the user terminal 400.

In the steps from S406 to S410, the first control part 111 authenticates the user by FIDO authentication. In step S406, the user terminal control part 401 having received the challenge code cc6 executes second local authentication. The second local authentication refers to the local authentication of the user, which is executed by the user terminal 400 in response to the execution of the second request. When the second local authentication succeeds, then in step S408, the user terminal control part 401 signs the challenge code cc6 by using the first private key PK1. The challenge code cc6 signed by using the first private key PK1 is also referred to as a signed code cc6s. The user terminal control part 401 then returns the signed code cc6s to the first node 110. In step S410, the first control part 111 having received the signed code cc6s verifies the signature of the signed code cc6s by using the first public key OK1. The public key authentication of the user terminal 400 to be executed by the first control part 111 after the second local authentication, like in step S410, is also referred to as second public key authentication.

In step S412, the first control part 111 requests the second node 210 to perform the second authentication, by specifying the second wallet W2 using the first specification information sp1. More specifically, the first control part 111 specifies the second wallet W2 by transmitting, as the header, the second wallet address WA2 serving as the second identifier, to the second node 210. As described above, in the present embodiment, the second authentication is requested after the completion of the FIDO authentication by the second local authentication and the second public key authentication. In step S412 in the present embodiment, the first control part 111 further transmits the signed code cc31s stored in the first wallet W1, to the second node 210.

When the second authentication is requested, then in step S414, the second control part 211 verifies the correspondence between the signed codes. When the signed codes correspond to each other, then in step S416, the second control part 211 transmits an authentication success notification to the first node 110. Then in step S418, the first control part 111 notifies the user terminal 400 of the success of the second authentication.

FIG. 9 illustrates the processing of the case where the verification of the signed codes has failed in step S414 of FIG. 8, in the second authentication processing. In step S420, the second control part 211 specifies the second wallet address WA2 as a transmission destination, transmits a challenge code cc71 to the user terminal 400, and returns a challenge code cc72 corresponding to the challenge code cc71, to the first node 110. In the present embodiment, the challenge code cc71 and the challenge code cc72 are the same code. In step S422, the first node 110 specifies the second wallet address WA2 as a transmission destination, and transmits the challenge code cc72 to the user terminal 400.

In step S424, the user terminal control part 401 executes the local authentication of the user. When the local authentication succeeds, then in step S426, the user terminal control part 401 digitally signs the challenge code cc71 and the challenge code cc72, by using the second private key PK2 paired with the specified second wallet address WA2. The user terminal control part 401 then returns a signed code cc71s serving as the challenge code cc71 signed by using the second private key PK2, to the second node 210, and returns a signed code cc72s serving as the challenge code cc72 signed by using the second private key PK2, to the first node 110.

In step S428, the second control part 211 verifies the signature of the signed code cc71s, by using the second public key OK2. When the verification of the signature succeeds, then in step S430, the second control part 211 stores the signed code cc71s into the second wallet W2 as a fifth non-fungible token T5 having non-fungibility. In step S430, a transaction TX23 illustrated in FIG. 3 is executed. The transaction TX23 includes the description of the second wallet address WA2 and a layer IDb3 as storage destination information, and the description of the signed code cc71s serving as signature data, as stored data information. An expiration date may be set for the signed code cc71s stored as the fifth non-fungible token T5.

In step S432, the first control part 111 transmits the signed code cc72s and the first wallet address WA1 to the second node 210. In step S434, the second control part 211 determines whether or not the signed code cc71s and the signed code cc72s correspond to each other. When determining that the codes correspond to each other, then in step S436, the second control part 211 stores the second specification information sp2 serving as specification information data into the second wallet W2, as the fifth non-fungible token T5. In step S436, a transaction TX24 illustrated in FIG. 3 is executed. The transaction TX24 includes the description of the second wallet address WA2 and the layer IDb3, as storage destination information, and the description of the second specification information sp2 serving as specification information data, as stored data information. When determining that the codes correspond to each other, the second control part 211 then authenticates the first node 110, and thereafter in step S438, notifies the first node 110 of the success of the authentication.

In step S440, the first control part 111 stores the first specification information sp1 and the signed code cc72s into the first wallet W1, as a sixth non-fungible token T6 having non-fungibility. In step S440, a transaction TX16 illustrated in FIG. 2 is executed. The transaction TX16 includes the description of the first wallet address WA1 and a layer IDa3, as storage destination information, and the description of the first specification information sp1 serving as specification information data, as stored data information. Step S442 is the same as step S418 of FIG. 8.

The authentication method according to the present embodiment is realized, through the execution of the respective steps described above, of the pre-registration processing, the cooperative connection processing, the first authentication processing, and the second authentication processing.

In the present embodiment, when authenticating the second node 210 in the first authentication, the first control part 111 then provides the first information inf1 to the second node 210. In this case, the first control part 111 provides the first information inf1 acquired from the first database 190, to the second node 210. In the same manner as above, when authenticating the first node 110 in the second authentication, the second control part 211 then provides the second information inf2 acquired from the second database 290, to the first node 110. FIG. 1 illustrates, by one-dot-chain lines, an example of the path through which the first control part 111 acquires the second information inf2, and an example of the path through which the second control part 211 acquires the first information inf1. Prior to the provision of the first information inf1 or the second information inf2, the correspondence of the signed codes may be verified again.

When providing the first information inf1 to the second node 210, the first control part 111 then records, into the first decentralized ledger DL1, the first provision information indicating the provision of the first information inf1 to the second node 210. In the same manner as above, the second control part 211 records, into the second decentralized ledger DL2, the second provision information indicating the provision of the second information inf2 to the first node 110. In the present embodiment, the first provision information or the second provision information is recorded through the execution of a transaction stored in a block added to each decentralized ledger, on the decentralized ledger. FIG. 2 illustrates, as an example of such a transaction, a transaction TX17 including the description of the first wallet address WA1 and a layer IDa4, as storage destination information, and the description of a first provision information PR1 serving as provision information data, as stored data information. One example of the provision information may include the URI of the first information inf1 or the second information inf2, and the first specification information sp1 or the second specification information sp2.

According to the authentication system 10 in the present embodiment described above, the first wallet W1 stores the URI of the first information inf1 and the first specification information sp1 serving as the first non-fungible token T1; and the second wallet W2 stores the URI of the second information inf2 and the second specification information sp2 serving as the second non-fungible token T2. In response to the first request, the second control part 211 requests the first authentication, by specifying the first wallet W1 using the second specification information sp2. In response to the second request, the first control part 111 requests the second authentication, by specifying the second wallet W2 using the first specification information sp1. Accordingly, the use of the first specification information sp1 allows for the request of the authentication of the first node 110, and the use of the second specification information sp2 allows for the request of the authentication of the second node 210. Therefore, for the case where each node requests authentication, the node does not need to share the first information inf1 or the second information inf2 with others, or to exchange the first information inf1 or the second information inf2 with others. This enables to reduce a security risk in the authentication of the first node 110 and the second node 210, and enables to appropriately connect the first decentralized network 101 and the second decentralized network 201 in a cooperative state.

In the case where the first decentralized network 101 and the second decentralized network 201 are brought into a cooperative connection state by cooperative connection application such as DEX (decentralized exchange), the DEX or the like may become a weak point on security. In the present embodiment, such a security risk is reduced because the DEX or the like is not required. In the case where the first decentralized network 101 and the second decentralized network 201 are brought into a cooperative connection state via a decentralized network for cooperative connection, the standards of the first decentralized network 101 and the second decentralized network 201 need to be adapted to the standard of the decentralized network for cooperative connection, in general. The decentralized network for cooperative connection configured as a blockchain network is also referred to as relay chain. In the present embodiment, the first decentralized network 101 and the second decentralized network 201 are easily brought into a cooperative connection state because relay chain or the like is not required.

In the present embodiment, the first decentralized ledger DL1 and the second decentralized ledger DL2 are respectively structured by blockchain; the first information inf1 and the first specification information sp1 are respectively stored into the first wallet W1 through the execution of the transactions stored in the blocks added to the first decentralized ledger DL1; and the second information inf2 and the second specification information sp2 are respectively stored into the second wallet W2 through the execution of the transactions stored in the blocks added to the second decentralized ledger DL2. This enables to structure the first decentralized network 101 and the second decentralized network 201 as blockchain networks, respectively. Accordingly, the structure enables to reduce a risk compared to centralized information management.

In the present embodiment, the first specification information sp1 specifies the second wallet W2 by the combination of the first identifier and the second identifier, and the second specification information sp2 specifies the first wallet W1 by the combination of the third identifier and the fourth identifier. In response to the first request, the second control part 211 specifies the first wallet W1 by transmitting the fourth identifier to the first node 110. In response to the second request, the first control part 111 specifies the second wallet W2 by transmitting the second identifier to the second node 210. Therefore, the exchange of the second identifier or the fourth identifier between nodes allows for easily requesting the first authentication or the second authentication. In particular, the first identifier or the third identifier, or the information corresponding to the first identifier or the third identifier is prevented from being exchanged between nodes when the first authentication or the second authentication is requested, thereby enabling to reduce the risk that the authentication request destination is read by a third party even if the request for the first authentication or the request for the second authentication is intercepted by the third party. This enables to further reduce a security risk.

In the present embodiment, the first signed code is stored in the first wallet W1 as the first non-fungible token T1, and the second signed code is stored in the second wallet W2 as the second non-fungible token T2. When receiving the first request, the second control part 211 then transmits the second signed code to the first node 110. In the first authentication, the first control part 111 determines whether or not the first signed code and the second signed code correspond to each other, and when determining that the codes correspond to each other, then authenticates the second node 210. Therefore, the second node 210 is easily authenticated, through the verification of the correspondence between the first signed code serving as the first non-fungible token T1 and the second signed code serving as the second non-fungible token T2.

In the present embodiment, an expiration date is set for the first signed code stored as the first non-fungible token T1, and the first control part 111 determines whether or not the first signed code not having expired yet and the second signed code correspond to each other, in the first authentication. Accordingly, only in the case where the first signed code has not expired, the second node 210 is authenticated, thereby enabling to further reduce a security risk in the first authentication.

In the present embodiment, when authenticating the second node 210, the first control part 111 then provides the first information inf1 to the second node 210, and records the first provision information into the first decentralized ledger DL1. This enables to improve tamper resistance of the first decentralized ledger DL1.

In the present embodiment, the first control part 111, when authenticating the second node 210, then provides the first information inf1 acquired from the first database 190, to the second node 210, and the second control part 211, when authenticating the first node 110, then provides the second information inf2 acquired from the second database 290, to the first node 110. This enables to further reduce a security risk, compared to other embodiments, for example, the embodiment in which the second node 210 directly accesses the first information inf1, and the embodiment in which the first node 110 directly accesses the second information inf2.

In the present embodiment, when the first request is executed, the second control part 211 then requests the first node 110 to perform the first authentication, after the completion of the first local authentication and the first public key authentication. When the second request is executed, the first control part 111 then requests the second node 210 to perform the second authentication, after the completion of the second local authentication and the second public key authentication. Therefore, each node, when having received the first request or the second request from the user terminal 400, then requests the authentication of the node, after the completion of the appropriate authentication of the user terminal 400 by use of the local authentication and the public key authentication.

B. Second Embodiment

Figure 10:
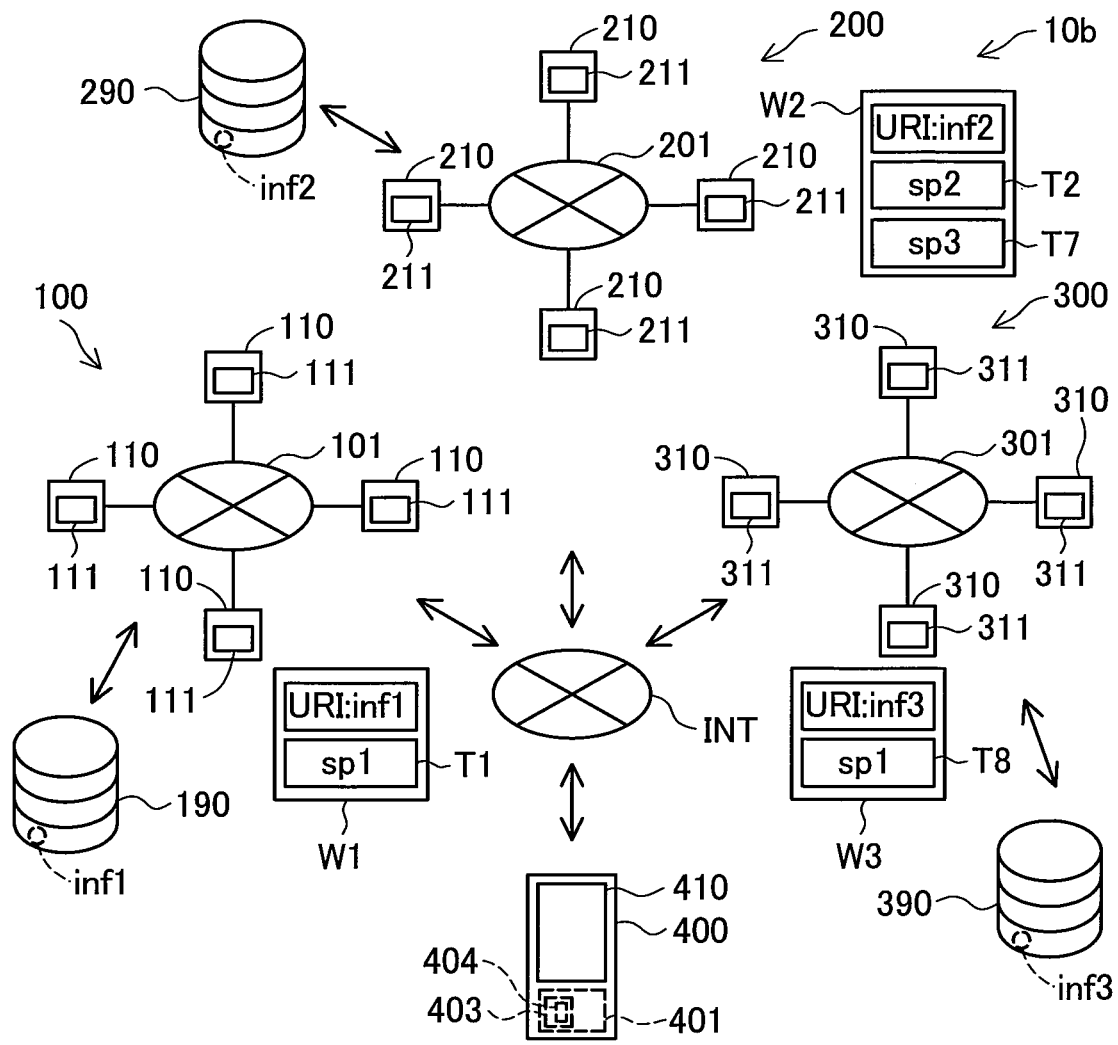
FIG. 10 is an explanatory diagram illustrating an authentication system in a second embodiment.

FIG. 10 is an explanatory diagram illustrating an authentication system 10b in the second embodiment. Unlike the first embodiment, the authentication system 10b includes a third network system 300. The authentication system 10b has the same configurations as those of the first embodiment, except some specifically specified parts.

The third network system 300 includes a third decentralized network 301 equipped with a plurality of third nodes 310. The third decentralized network 301 is connected to the Internet INT, in the same manner as other networks and the user terminal 400 in the authentication system 10b. Each of the third nodes 310 is configured to access third information inf3 about the user stored in a third database 390 which is accessible from the third decentralized network 301. The third nodes 310 share a third decentralized ledger structured by blockchain. Each of the third nodes 310 includes a third control part 311 configured as a computer, as with the first control part 111.

In the present embodiment, the second wallet W2 stores not only the second specification information sp2, but also a third specification information sp3 which specifies a third wallet W3 of the third decentralized ledger, as a seventh non-fungible token T7 having non-fungibility. The third specification information sp3 is in, for example, a multi-layer-registration-type data structure, as with the first specification information sp1 and the second specification information sp2. The third wallet W3 stores the URI of the third information inf3 and the first specification information sp1. The third wallet W3 stores the first specification information sp1 as an eighth non-fungible token T8 having non-fungibility. In the present embodiment, the second decentralized network 201 and the third decentralized network 301 are thus in a cooperative connection state, as with the first decentralized network 101 and the second decentralized network 201 being in a cooperative connection state. The second decentralized network 201 and the third decentralized network 301 are brought into a cooperative connection state, for example, through the execution of the same processing as the cooperative connection processing of FIG. 5 among the user terminal 400, the second node 210, and the third node 310.

In the authentication system 10b, although the third specification information sp3 is not stored in the first wallet W1, the first control part 111 is able to acquire the third information inf3 via the second node 210. More specifically, for example, the first control part 111 makes the second node 210 authenticate the first node 110 by using the first specification information sp1, and thereafter makes the second control part 211 request the third node 310 to perform the authentication of the second node 210 by using the third specification information sp3 stored in the second wallet W2. The second node 210 is authenticated by the third node 310, for example, through the execution of the same processing as the first authentication processing illustrated in FIG. 6 and FIG. 7, among the user terminal 400, the second node 210, and the third node 310. When the second node 210 is authenticated by the third node 310, the second control part 211 then acquires the third information inf3 from the third node 310, as an example. The first control part 111 is thus able to acquire the third information inf3 acquired by the second control part 211. In the same manner as above, the third control part 311 may acquire the first information inf1 via the second node 210. In this case, the third node 310 is authenticated by the second node 210, for example, through the execution of the same processing as the second authentication processing illustrated in FIG. 8 and FIG. 9, among the user terminal 400, the second node 210, and the third node 310.

In this way, the first decentralized network 101 and the third decentralized network 301 are connected in a cooperative state, while achieving reduction in the amounts of data stored in the first wallet W1 and the third wallet W3. The fact that the first wallet W1 and the third wallet W3 are associated with each other is not read from the information stored in the first wallet W1, thus achieving further reduction of a security risk. In another embodiment, the authentication system 10b may include, for example, four or more decentralized networks.

C. Third Embodiment

Figure 11:
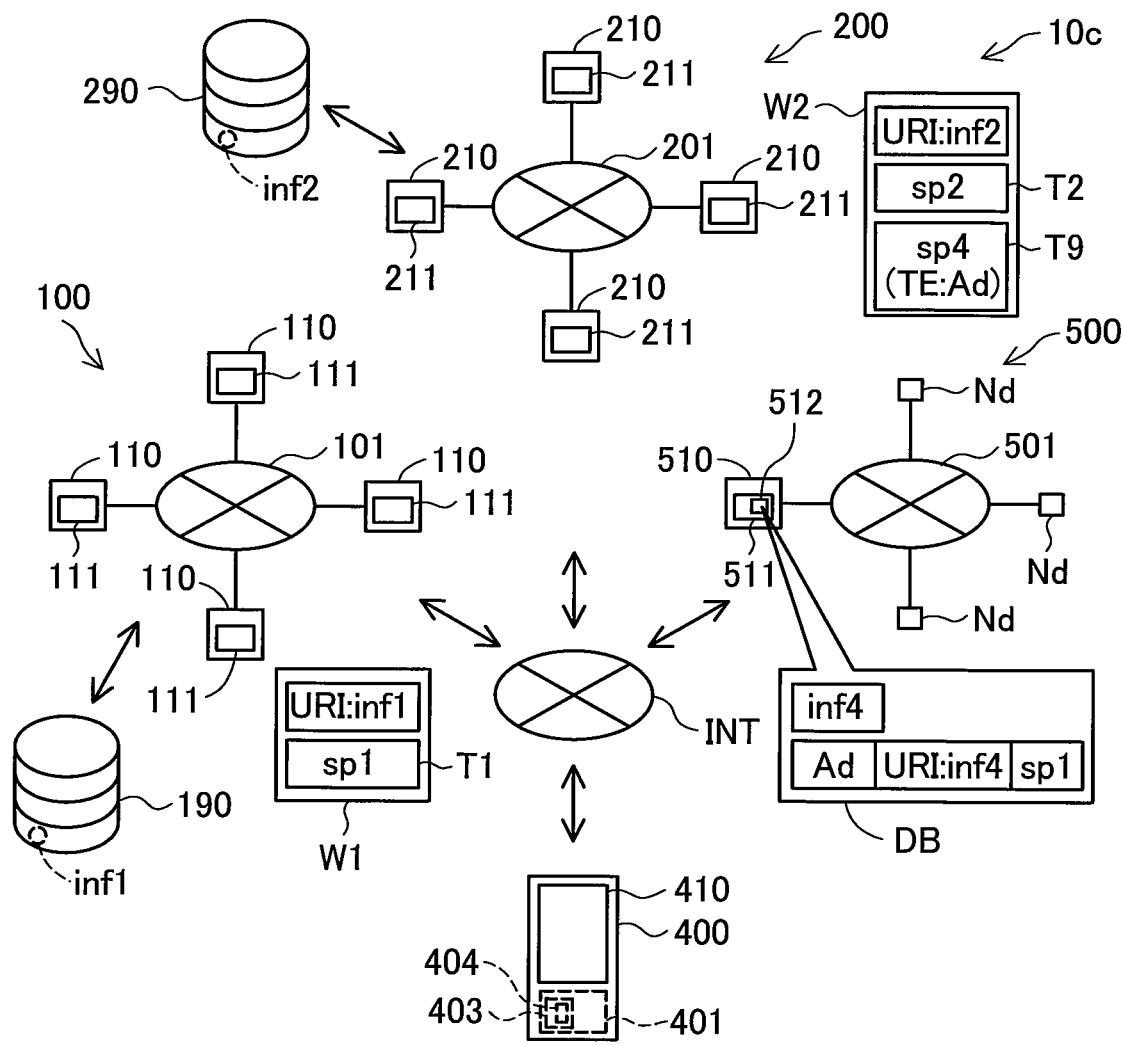
FIG. 11 is an explanatory diagram illustrating an authentication system in a third embodiment.

FIG. 11 is an explanatory diagram illustrating an authentication system 10c in the third embodiment. Unlike the first embodiment, the authentication system 10c includes a fourth network system 500. The authentication system 10c has the same configurations as those of the first embodiment, except some specifically specified parts.

The fourth network system 500 includes a non-decentralized network 501. The network 501 is equipped with a plurality of nodes Nd including a terminal device 510. The network 501 is connected to the Internet INT, in the same manner as other networks and the user terminal 400 in the authentication system 10c. In the present embodiment, the fourth network system 500 is configured as a centralized network in a medical institution.

The terminal device 510 includes a fourth control part 511. As with the first control part 111, the fourth control part 511 is configured as a computer including a CPU, a storage part 512, and an input/output interface. The terminal device 510 is configured to be accessible to fourth information inf4 about the user who uses the user terminal 400. In the present embodiment, the fourth information inf4 is an ID given to the user as an identification number of a patient in a medical institution, and is stored in a database DB in the storage part 512.

In the present embodiment, the database DB in the storage part 512 stores the URI of the fourth information inf4 and the first specification information sp1, with an address Ad unique in the database DB as a primary key. The second wallet W2 stores not only the second specification information sp2, but also a fourth specification information sp4, as a ninth non-fungible token T9 having non-fungibility. The fourth specification information sp4 specifies a record having the address Ad serving as a primary key in the database DB, by the combination of the fifth identifier indicating the terminal device 510 and the sixth identifier unique in the database DB. The fourth specification information sp4 is indicated in the form of "Fifth identifier: Sixth identifier" in FIG. 11. In the present embodiment, the fifth identifier is the URN of the terminal device 510, and is indicated as "TE" in FIG. 11. The sixth identifier is the address Ad.

In the present embodiment, as described above, the fourth specification information sp4 is stored in the second wallet W2, and the first specification information sp1 is stored with the address Ad as a primary key in the database DB, so that the network 501 and the second decentralized network 201 are in a cooperative connection state. The network 501 and the second decentralized network 201 are brought into a cooperative connection state, for example, through the execution of the same processing as the cooperative connection processing of FIG. 5, among the user terminal 400, the second node 210, and the terminal device 510. In this case, in the processing corresponding to step S228 of FIG. 5, the fourth control part 511 transmits a signed challenge code and the address Ad to the second node 210. In the processing corresponding to step S236, the fourth control part 511 stores the URI of the fourth information inf4 and the first specification information sp1 into the storage part 512 with the address Ad as a primary key.

In the present embodiment, in response to a request from the user terminal control part 401, the fourth control part 511 is able to request the second node 210 to authenticate the terminal device 510 based on the ninth non-fungible token T9 using the first specification information sp1. The second node 210 authenticates the terminal device 510, for example, through the execution of the same processing as the first authentication processing illustrated in FIG. 6 and FIG. 7, among the user terminal 400, the second node 210, and the terminal device 510. The fourth control part 511 is thereby able to acquire the second information inf2 from the second node 210, as an example. In the same manner, the second control part 211 may request the terminal device 510 to authenticate the second node 210 based on the first specification information sp1 stored with the address Ad as a primary key, using the fourth specification information sp4. In this case, the terminal device 510 authenticates the second node 210, for example, through the execution of the same processing as the second authentication processing illustrated in FIG. 8 and FIG. 9, among the user terminal 400, the second node 210, and the terminal device 510. For example, the fourth control part 511 may acquire the first information inf1 via the second node 210, in the same manner as described in the third embodiment. In the same manner, the first control part 111 may acquire the fourth information inf4 via the second node 210.

In another embodiment, the first decentralized network 101 and a non-decentralized network may be in a cooperative connection state, or one decentralized network and two or more non-decentralized networks may be in a cooperative connection state.

D. Other Embodiments (D1) In the embodiments described above, the first network system 100 is configured as a personal number management system, and the second network system 200 is configured as a medical data management system. The respective network systems do not need to be configured in the manner above. For example, the first network system 100 may be configured as a medical data management system, and the second network system 200 may be configured as a personal number management system. Alternatively, respective network systems may be configured as other systems, for example, a financial data management system. In another example, respective network systems may be configured as system which provide a virtual space service such as a so-called metaverse. In this case, the first information inf1 and the second information inf2 may be data indicating, for example, items owned by the user in virtual space.

(D2) In the embodiments described above, the first decentralized ledger DL1 and the second decentralized ledger DL2 are structured by blockchain. The first decentralized ledger DL1 or the second decentralized ledger DL2 does not need to be structured by blockchain, and alternatively may be configured as another-type decentralized ledger. In this case, the first decentralized ledger DL1 and the second decentralized ledger DL2 may be structured by directed acyclic graph, hashgraph, holochain, or the like.

(D3) In the embodiments described above, the first specification information sp1 includes the first identifier and the second identifier. The first specification information sp1 does not need to include the first identifier or the second identifier. For example, the first specification information sp1 may be indicated by one identifier uniquely indicating "a wallet itself of a decentralized ledger". Similarly, the second specification information sp2 does not need to include the third identifier or the fourth identifier.

(D4) In the embodiments described above, in the first authentication, the first control part 111 determines whether or not the first signed code and the second signed code correspond to each other, and when the codes correspond to each other, then authenticates the second node 210. Alternatively, in the first authentication, the first control part 111 does not need to authenticate the second node 210 in the manner above, and may verify whether or not the second wallet address WA2 transmitted from the second control part 211 and the first specification information sp1 stored in the first wallet W1 as the first non-fungible token T1 correspond to each other, and when verifying that they correspond to each other, then authenticate the second node 210. Similarly, in the second authentication, the second control part 211 does not need to determine whether or not the first signed code and the second signed code correspond to each other.

(D5) In the embodiments described above, an expiration date may further be set for the second signed code stored as the second non-fungible token T2, or for the signed code cc52s stored as the fourth non-fungible token T4. Alternatively, an expiration date does not need to be set for the first signed code stored as the first non-fungible token T1, or for the signed code cc51s stored as the third non-fungible token T3. In this case, simply, an expiration date does not need to be set for each signed code. Alternatively, in step S232 of FIG. 5, a null value may be stored as signature data into the layer IDa1 of the first wallet W1. In this case, the transaction TX12 includes the description of the signature data of a null value, as stored data information. In the first authentication processing of FIG. 6, the signed codes thus do not correspond to each other in step S314, and accordingly, after the verification of the signature by use of the new challenge codes illustrated in FIG. 7, the first node 110 becomes able to authenticate the second node 210. This enables to further reduce a security risk in the first authentication. Similarly, a null value may be stored as signature data into the layer IDa2 of the first wallet W1 in step S340 of FIG. 7.

(D6) In the embodiments described above, the first control part 111 records the first provision information PR1 in the first decentralized ledger DL1 in the embodiment described above. Alternatively, the first control part 111 does not need to record the first provision information PR1. Similarly, the second control part 211 does not need to record the second provision information in the second decentralized ledger DL2.

(D7) In the embodiments described above, when authenticating the second node 210, the first control part 111 then provides the first information inf1 acquired from the first database 190, to the second node 210. Alternatively, the first control part 111 does not need to provide the first information inf1 in the manner above. For example, when authenticating the second node 210, the first control part 111 may then grant access permission to the second node 210 for the first information inf1 on the first database 190. The access permission may be granted temporarily. Similarly, when authenticating the first node 110, the second control part 211 then does not need to provide the second information inf2 acquired from the second database 290, to the first node 110.

(D8) In the embodiments described above, the first control part 111 and the second control part 211 request the second authentication and the first authentication, respectively, after the completion of the FIDO authentication. Alternatively, the first control part 111 or the second control part 211 does not need to execute the FIDO authentication. For example, after the authentication of the user terminal control part 401 by password authentication, the first control part 111 and the second control part 211 may request the second authentication and the first authentication, respectively.

REFERENCE SIGNS LIST 10, 10b, 10c AUTHENTICATION SYSTEM
100 FIRST NETWORK SYSTEM
101 FIRST DECENTRALIZED NETWORK
110 FIRST NODE
111 FIRST CONTROL PART
190 FIRST DATABASE
200 SECOND NETWORK SYSTEM
201 SECOND DECENTRALIZED NETWORK
210 SECOND NODE
211 SECOND CONTROL PART
290 SECOND DATABASE
300 THIRD NETWORK SYSTEM
301 THIRD DECENTRALIZED NETWORK
310 THIRD NODE
311 THIRD CONTROL PART
390 THIRD DATABASE
400 USER TERMINAL
401 USER TERMINAL CONTROL PART
403 STORAGE PART
404 PROGRAM
410 DISPLAY PART
500 FOURTH NETWORK SYSTEM
501 NETWORK
510 TERMINAL DEVICE
511 FOURTH CONTROL PART
512 STORAGE PART

What is claimed is:

1. An authentication system comprising:
a first decentralized network equipped with a plurality of first nodes, the plurality of first nodes sharing a first decentralized ledger, the plurality of first nodes being accessible to first information about a user;
a second decentralized network equipped with a plurality of second nodes, the plurality of second nodes sharing a second decentralized ledger, the plurality of second nodes being accessible to second information about the user; and
a user terminal used by the user, the user terminal having a user terminal control part, wherein
each of the plurality of first nodes has a first control part,
each of the plurality of second nodes has a second control part,
a first wallet of the first decentralized ledger stores a URI of the first information, and first specification information for specifying a second wallet of the second decentralized ledger, the first specification information is stored as a first non-fungible token serving as a token having non-fungibility,
the second wallet of the second decentralized ledger stores a URI of the second information, and second specification information for specifying the first wallet, the second specification information is stored as a second non-fungible token serving as a token having non-fungibility,
in response to a first request from the user terminal control part, the second control part requests the first node to perform first authentication to authenticate the second node for the user based on the first non-fungible token, by specifying the first wallet using the second specification information, and
in response to a second request from the user terminal control part, the first control part requests the second node to perform second authentication to authenticate the first node for the user based on the second non-fungible token, by specifying the second wallet using the first specification information.

2. The authentication system according to claim 1, wherein
the first decentralized ledger and the second decentralized ledger are structured by blockchain, respectively,
the URI of the first information and the first specification information are respectively stored into the first wallet, through execution of transactions stored in blocks added to the first decentralized ledger, and
the URI of the second information and the second specification information are respectively stored into the second wallet, through execution of transactions stored in blocks added to the second decentralized ledger.

3. The authentication system according to claim 1, wherein
the first specification information includes a first identifier indicating the second decentralized network, and a second identifier unique in the second decentralized ledger, and specifies the second wallet by a combination of the first identifier and the second identifier,
the second specification information includes a third identifier indicating the first decentralized network, and a fourth identifier unique in the first decentralized ledger, and specifies the first wallet by a combination of the third identifier and the fourth identifier,
the second control part, in response to the first request, specifies the first wallet by transmitting the fourth identifier to the first node, and
the first control part, in response to the second request, specifies the second wallet by transmitting the second identifier to the second node.

4. The authentication system according to claim 1, wherein
the first wallet stores a first signed code serving as a first authentication code signed by using a private key of the user terminal, as the first non-fungible token,
the second wallet stores a second signed code as the second non-fungible token, the second signed code serving as a second authentication code signed by using the private key, the second authentication code corresponding to the first authentication code,
when the first request is executed, the second control part then transmits the second signed code to the first node, and
when the first authentication is requested, the first control part then determines whether or not the first signed code and the second signed code correspond to each other, and when the first signed code and the second signed code correspond to each other, then authenticates the second node.

5. The authentication system according to claim 4, wherein
an expiration date is set for the first signed code stored as the first non-fungible token, and
when the first authentication is requested, the first control part then determines whether or not the first signed code not having expired yet and the second signed code correspond to each other.

6. The authentication system according to claim 1, wherein
the first control part, when authenticating the second node, then provides the first information to the second node, and records information indicating provision of the first information to the second node, into the first decentralized ledger.

7. The authentication system according to claim 1, wherein
the first information is stored in first database accessible from the first decentralized network,
the second information is stored in second database accessible from the second decentralized network,
the first control part, when authenticating the second node, then provides the first information acquired from the first database, to the second node, and
the second control part, when authenticating the first node, then provides the second information acquired from the second database, to the first node.

8. The authentication system according to claim 1, wherein
when the first request is executed, the second control part then requests the first node to perform the first authentication, after completion of first local authentication of the user by the user terminal, and first public key authentication of the user terminal executed by the second control part after the first local authentication, and
when the second request is executed, the first control part then requests the second node to perform the second authentication, after completion of second local authentication of the user by the user terminal, and second public key authentication of the user terminal executed by the first control part after the second local authentication.

9. A user terminal to be used by a user, the user terminal comprising
a user terminal control part, wherein
the user terminal control part is configured to execute a second request, to a first node belonging to a first decentralized network equipped with a plurality of nodes sharing a first decentralized ledger, and the first node is accessible to first information about the user,
the user terminal control part is configured to execute a first request, to a second node belonging to a second decentralized network equipped with a plurality of nodes sharing a second decentralized ledger, and the second node is accessible to second information about the user,
a first wallet of the first decentralized ledger stores a URI of the first information, and first specification information for specifying a second wallet of the second decentralized ledger, the first specification information is stored as a first non-fungible token serving as a token having non-fungibility,
the second wallet of the second decentralized ledger stores a URI of the second information, and second specification information for specifying the first wallet, the second specification information is stored as a second non-fungible token serving as a token having non-fungibility,
a second control part of the second node, when the first request is executed, then requests the first node to perform first authentication to authenticate the second node for the user based on the first non-fungible token, by specifying the first wallet using the second specification information, and
a first control part of the first node, when the second request is executed, then requests the second node to perform second authentication to authenticate the first node for the user based on the second non-fungible token, by specifying the second wallet using the first specification information.

10. An authentication method comprising the steps of:
storing a URI of first information about a user, into a first wallet of a first decentralized ledger shared by a plurality of nodes included in a first decentralized network;
storing, into the first wallet, first specification information for specifying a second wallet of a second decentralized ledger shared by a plurality of nodes included in a second decentralized network, as a first non-fungible token;
storing a URI of second information about the user into the second wallet;
storing second specification information for specifying the first wallet into the second wallet, as a second non-fungible token;
requesting a first node to authenticate a second node for the user based on the first non-fungible token, by specifying the first wallet using the second specification information, the first node belonging to the first decentralized network and being accessible to the first information, the second node belonging to the second decentralized network and being accessible to the second information; and
requesting the second node to authenticate the first node for the user based on the second non-fungible token, by specifying the second wallet using the first specification information.

11. A non-transitory computer-readable storage medium that stores a program to be executed by a computer configured to control a user terminal used by a user, the program making the computer realize the functions of:
executing a second request to a first node belonging to a first decentralized network and being accessible to first information about the user, the first decentralized network equipped with a plurality of nodes sharing a first decentralized ledger; and
executing a first request to a second node belonging to a second decentralized network and being accessible to second information about the user, the second decentralized network equipped with a plurality of nodes sharing a second decentralized ledger, wherein
a first wallet of the first decentralized ledger stores a URI of the first information, and first specification information for specifying a second wallet of the second decentralized ledger, the first specification information is stored as a first non-fungible token serving as a token having non-fungibility,
the second wallet of the second decentralized ledger stores a URI of the second information, and second specification information for specifying the first wallet, the second specification information is stored as a second non-fungible token serving as a token having non-fungibility,
when the first request is executed, a second control part of the second node then requests the first node to perform first authentication to authenticate the second node for the user based on the first non-fungible token, by specifying the first wallet using the second specification information, and
when the second request is executed, a first control part of the first node then requests the second node to perform second authentication to authenticate the first node for the user based on the second non-fungible token, by specifying the second wallet using the first specification information.

\* \* \* \* \*